(No Model.)

B. M. LE GRANDE.
DRAFT EQUALIZER.

No. 519,768. Patented May 15, 1894.

Witnesses:
Louis C. Hills
E. H. Bond

Inventor:
Benjamin M. Le Grande
by E. B. Stocking
Attorney

UNITED STATES PATENT OFFICE.

BENJAMIN M. LE GRANDE, OF SOUTH HAVEN, KANSAS.

DRAFT-EQUALIZER.

SPECIFICATION forming part of Letters Patent No. 519,768, dated May 15, 1894.

Application filed December 4, 1893. Serial No. 492,660. (No model.)

*To all whom it may concern:*

Be it known that I, BENJAMIN M. LE GRANDE, a citizen of the United States, residing at South Haven, in the county of Sumner, State of Kansas, have invented certain new and useful Improvements in Draft-Equalizers, of which the following is a specification, reference being had therein to the accompanying drawings.

This invention relates to certain new and useful improvements in draft equalizers of that class in which provision is made for readily changing the same into a three or four horse equalizer as may be desired.

It has for its objects among others to provide a simplified and cheap construction, in which the parts, few in number, are compactly arranged and not liable to injury. I employ a connection between the long and short levers which serves as a push-bar, and to the free end of the short lever is pivotally attached a bar or double bar which embraces the short arm of the long lever and to the other end of which is attached the doubletree. The push-bar is preferably a compound bar consisting of two parallel metallic strips the ends of which are attached upon opposite sides of the long and short levers and between which is held a wooden strip which gives rigidity to the push-bar. Two ways are provided for changing from a four horse to a three horse equalizer.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1:
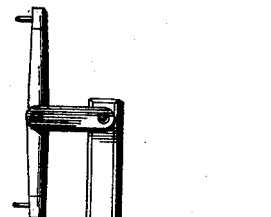
Figure 1:
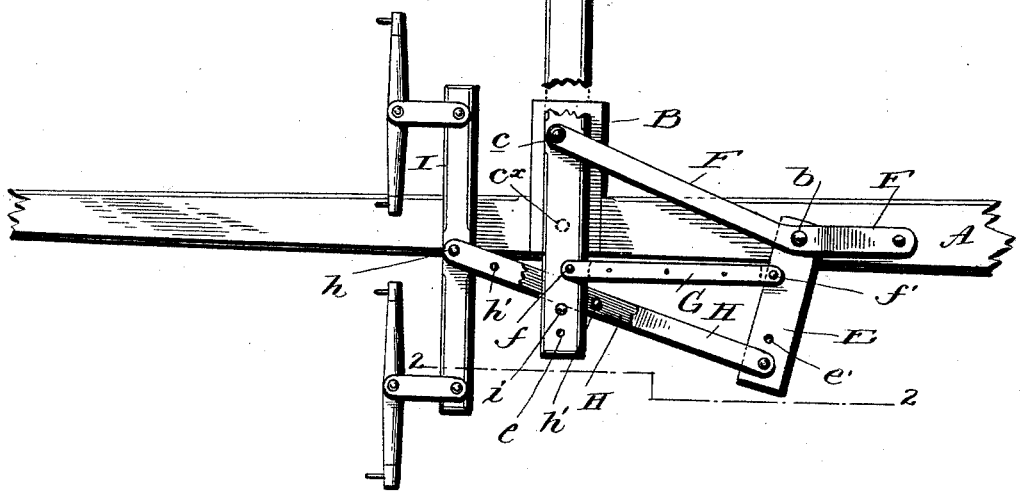
Figure 2:
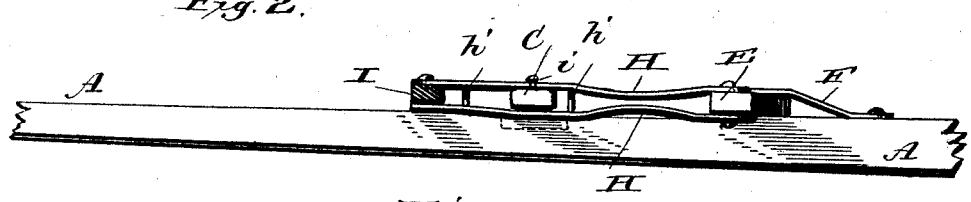
Figure 3:
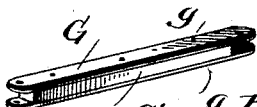

Figure 1 is a plan with parts broken away showing my improvements. Fig. 2 is a cross section on the line 2—2 of Fig. 1. Fig. 3 is a perspective view of the push-bar detached from the equalizer.

Like letters of reference indicate like parts throughout the several views in which they appear.

Referring now to the details of the drawings by letter, A designates the pole or tongue of ordinary form.

B is a metallic plate secured to the pole or tongue and extending laterally therefrom as seen in Fig. 1, and forming a rest for the long lever C as well as a support for the pivot $c$ on which the said long lever is pivoted. This long lever is provided at one end, the outer end of its longer arm, (the said lever being pivoted to one side of the center of its length,) with a plurality of holes $c'$ as shown in Fig. 1, for the adjustable attachment of the double-tree D, the pivot $a$ being removably held therein.

E is the short lever pivotally connected at one end with the pole as at $b$ to the rear of the long lever, the pivot thereof being made removable in any suitable manner. F is a metallic strap having one end secured to the pole or tongue to the rear of the pivot of the short lever and passing over the short and long levers is held on the pivots thereof as shown clearly in Fig. 1.

G is a rigid push-bar arranged parallel with the pole or tongue and consisting preferably of the upper and lower metallic bars or plates $g\ g$ and the wooden filling or bar $g'$ held therebetween in any suitable manner, the ends of the metallic straps or bars being extended beyond the filling piece and pivotally connected with the long and short levers at $f$ and $f'$ respectively. The connection of the push-bar with the short lever is in proximity to its pivot and that with the long lever is near the outer end of its short arm as seen best in Fig. 1.

Pivotally and adjustably connected with the end of the short lever farthest from its pivot are the metallic straps H, one above and one below, and embracing loosely the outer end of the short arm of the long lever as shown in Figs. 1 and 2 and their other ends having pivotally connected thereto the double-tree I by the pivot $h$, the straps H being bent toward each other upon opposite sides of the long lever and provided upon each side of the space which receives the said long lever with a stop pin $h'$ between which the long lever is free to play but by which the movement thereof is limited. The outward movement of these straps H is limited by the pin or stop $i$ removably held in the short arm of the long lever near its outer end as seen in Fig. 1.

With the parts constructed and arranged substantially as above described the operation is as follows:—as shown the device is arranged as a four horse equalizer. By removing the doubletrees and attaching one at the point $e$ at the extreme outer end of the short arm of the long lever, and a single-tree at the required one of the holes $c'$ near the other end of the longer lever the device is set for a three horse equalizer Also by removing the bolt or pivot $f'$ and pivoting the push-bar at the point $e'$ and removing the double-tree D and attaching in its stead a single-tree a three horse equalizer will be provided. The stay bolts $h'$ serve to limit the movement of the straps H and prevent the horses from getting too far ahead one of another. The push-bar serves to keep the long and short levers in their proper relative positions and also causes them to move in unison.

Modifications in detail may be resorted to without departing from the spirit of the invention or sacrificing any of its advantages. For instance, instead of pivoting the long lever C to the plate B, I may pivot it directly to the pole A (see dotted lines $c^\times$) in which case the strap F will be straight.

What I claim as new is—

The herein-described draft-equalizer, consisting of the tongue, the plate secured thereto and extending therefrom laterally, the long lever pivoted on said plate to one side of the center of its length, the double-tree adjustably held to the outer end of the longer arm of the said lever, the short lever pivotally secured at one end to the tongue to the rear of the long lever on a removable pivot, the metallic strap secured at one end to the tongue to the rear of the pivot of the short lever and passed over the long and short levers and held on the pivots thereof, the rigid push-bar arranged substantially parallel with the tongue and connected at one end with the push-bar near the pivot of the short lever and at the other end with the long lever near the outer end of its short arm, and the straps pivotally and adjustably connected with the end of the short lever farthest from its pivot and at their other ends carrying the double-tree, all substantially as shown and described.

In testimony whereof I affix my signature in presence of two witnesses.

BENJAMIN M. LE GRANDE.

Witnesses:
H. F. BRAWNER,
A. K. CULBERTSON.